O. H. Waters,
Clothes Drier,
Nº 25,474.      Patented Sept. 13, 1859.
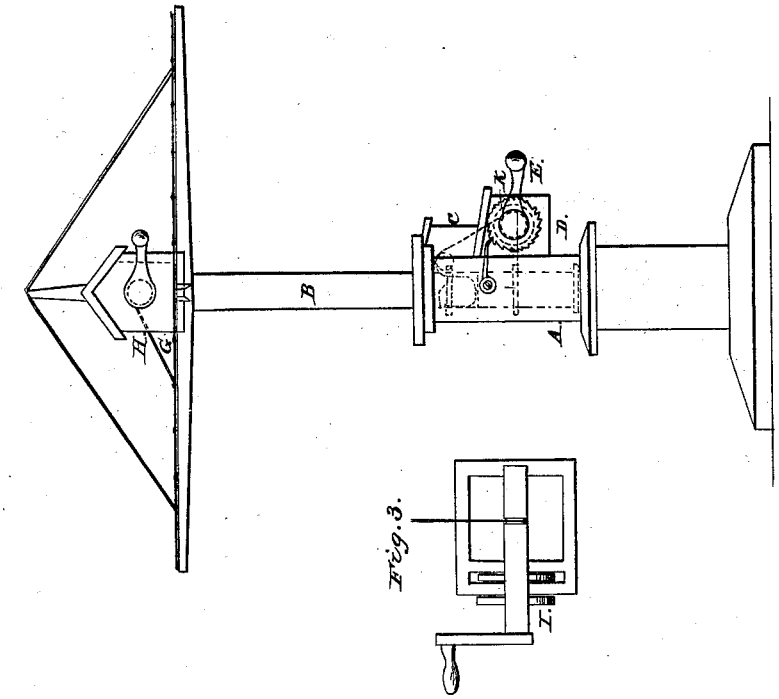
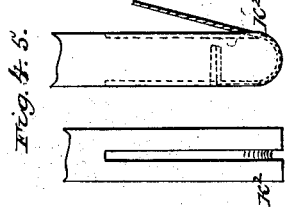
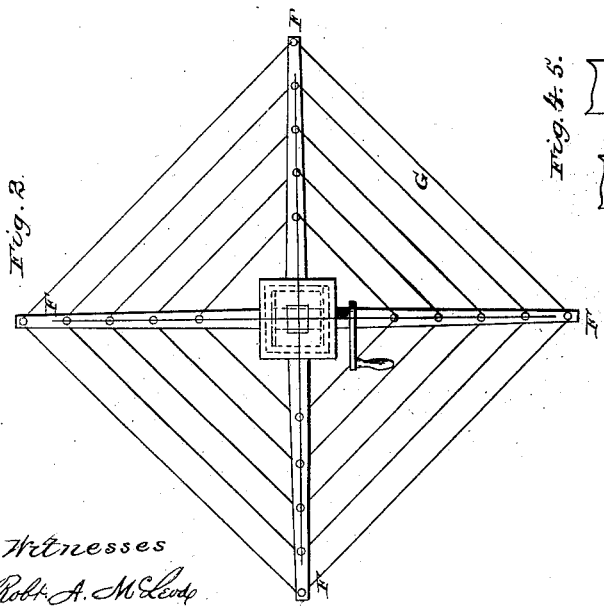
Witnesses
Robt. A. McLeod
J. S. Darner
Inventor:
O. H. Waters.

UNITED STATES PATENT OFFICE.

O. H. WATERS, OF BALTIMORE, MARYLAND, ASSIGNOR TO ALFRED HUNTER, OF WASHINGTON, DISTRICT OF COLUMBIA.

CLOTHES-DRIER.

Specification of Letters Patent No. 25,474, dated September 13, 1859.

*To all whom it may concern:*

Be it known that I, O. H. WATERS, of Baltimore, State of Maryland, have invented a new and Improved Arrangement of Devices for Drying Clothes; and I do hereby declare that the following is a full and exact description thereof, reference being had to the accompanying drawings and to letters of reference marked thereon.

Figure 1 is a perspective view. Fig. 2 is a view of the arms and clothes line from below. Fig. 3 an outline of the box and cylinder. Figs. 4, 5, sectional view of grooved post B.

The nature of my invention consists in the arrangement of devices hereinafter described.

To enable others skilled, in the art, to make and use my invention; I will proceed to describe its construction and operation.

I construct the upright box, A to contain, the perpendicular post B, that runs freely, in the box A, and is suspended upon a cord C, shown in dotted lines, that runs in groove $K^2$ cut in the bottom of the post B and is wound upon cylinder, D by crank E. Upon the top of the adjustable, grooved post B are placed four revolving, radial arms F upon which is arranged line, G upon which the clothes are hung. A box H, is placed above the arms in which is a cylinder, attached to a crank I for the purpose, of winding the line G when not in use, to protect it from the sun and rain which destroys it.

This machine, is used advantageously, in small yards over grass plats flower beds or can be placed upon the roofs of dwellings and other houses, enabling the laundress to stand in one place, and hang out, 75 or 100 pieces, of clothing without going from the crank; and when the clothes, are upon the line crank E attached to cylinder D in protector K, can be turned to raise the clothes to the height of 12 or 16 feet, where they can get the sun, and air, and will dry in one quarter of the time required near the damp ground in confined yards. A slight wind revolves the arms which assist the operation of drying.

What I claim as my invention, and desire to secure by Letters Patent, is—

The combination, and arrangement, of the adjustable grooved post B its radial arms F and box H with box A cylinder D and protector K the whole being constructed in the manner and for the purpose herein set forth.

O. H. WATERS.

Witnesses:
ROBT. A. McLEOD,
T. S. DAMER,
JOHN E. RIDGWAY.